8925X
J. Bouis,
Metal Roof,
Patented June 26, 1835.
NO PRINTED SPECIFICATION AVAILABLE
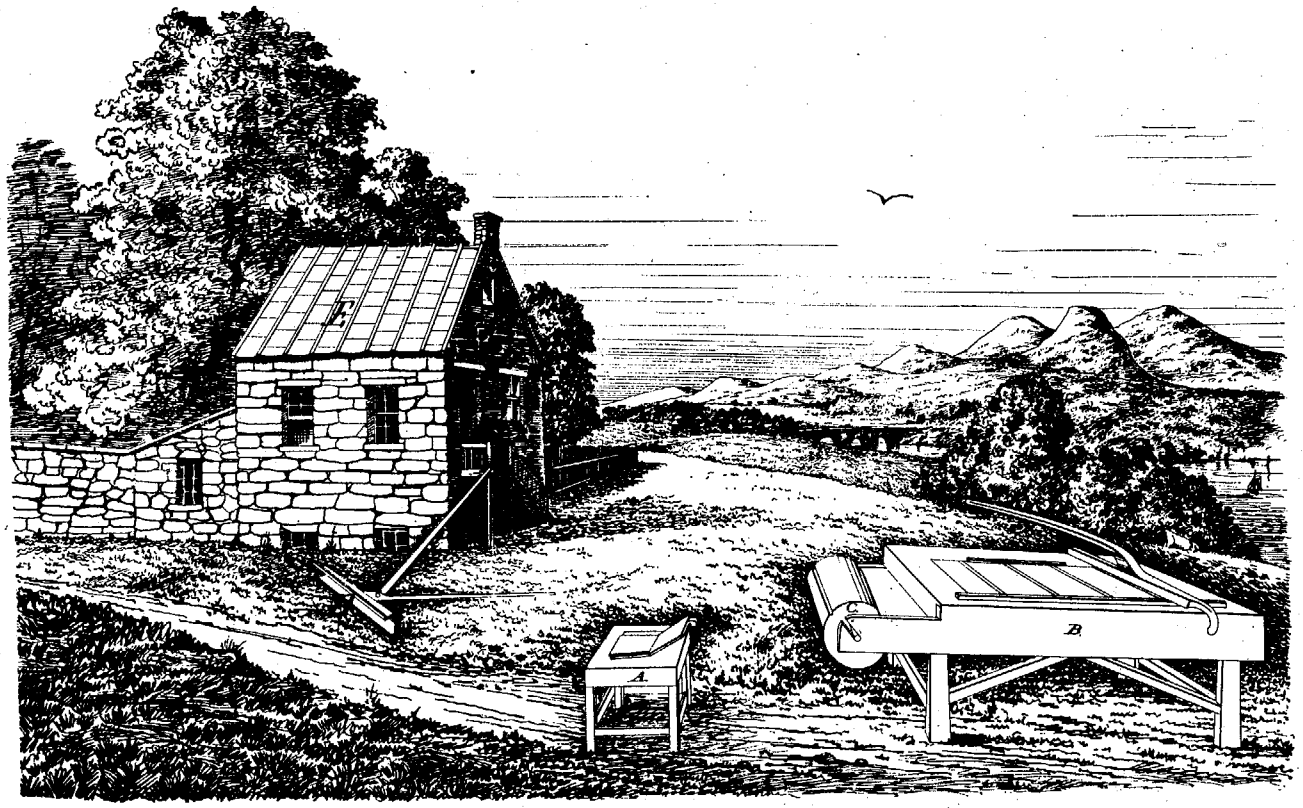

June 26 1835

John Bouis 8925X

Letters Patent

The Schedule referred to in these Letters Patent and making part of the same containing a description in the words of the said John Bouis himself of his improvement in making tin, copper and zink Roofs.

---

To all to whom these presents shall come. Be it known that I John Bouis of Baltimore in the County of Baltimore and State of Maryland have invented a new and useful machine for making tin, copper and zink Roofs and that the following is a full and exact description thereof. A. On a bench is placed an iron plate and above that a plate with a groove to receive the edge of the metal which when placed therein by means of a lever which moves up and down turns the edge B. When the sheets are edged by this machine they are placed under another lever or press and pressed down flat one on the other. There is likewise attached a C. roller on the end of the bench to roll the tin upon as it passes under the presser or lever which makes the roll of metal ready to be laid on the roof. The grooves or edges of the groove roofing being made in a semicircular form instead of an angle as formerly constructed, give the metal a better chance to expand or contract without the danger of cracking, and also forms a gutter to carry off the water and dirt without obstruction. The second advantage desirable from this machine is that the metal is so edged as to prevent its cracking and consequently avoid its susceptibility of rust and is impenetrable by water. D. The tongs to make the circular groove as above stated are made on one side of semicircular form and on the other with a flat edge, so that when the metal is placed between the two it is easily bent without cracking.

Witnesses John Bouis

Daniel Hauptman

Marc du Cant (Drawing)

E.C. [illegible]